United States Patent [19]
Kahle et al.

[11] 3,746,444
[45] July 17, 1973

[54] MICROFICHE RECORDER AND PROCESSOR

[75] Inventors: Rolf D. Kahle, Saratoga; David K. Studley, Santa Clara; James D. Bryson, Sunnyvale, all of Calif.

[73] Assignee: Bessemer Securities Corporation, Mountain View, Calif.

[22] Filed: Nov. 24, 1971

[21] Appl. No.: 201,642

[52] U.S. Cl. ................................. 355/28, 355/54
[51] Int. Cl. ........................................ G03b 27/46
[58] Field of Search .................. 355/53, 54, 46, 27, 355/28

[56] References Cited
UNITED STATES PATENTS

| | | | |
|---|---|---|---|
| 3,591,282 | 7/1971 | Renold | 355/54 |
| 3,601,487 | 8/1971 | Burton et al. | 355/54 |
| 3,627,413 | 12/1971 | Bushey et al. | 355/54 X |
| 3,631,781 | 1/1972 | Kennington et al. | 355/54 X |
| 3,572,925 | 3/1971 | Ables et al. | 355/54 X |
| 3,234,849 | 2/1966 | Back | 355/54 X |
| 3,557,675 | 1/1971 | Koll et al. | 355/27 X |

*Primary Examiner*—Samuel S. Matthews
*Assistant Examiner*—Richard A. Wintercorn
*Attorney*—Stephen S. Townsend, Albert J. Hillman et al.

[57] ABSTRACT

A microfiche recorder in which a platen is rectilinearly moved over a reference plate having an optical aperture through which images are projected onto film on the platen. A supply of recording film is stored on the platen for movement therewith to prevent film twisting and distortion. The platen moves slidably over the reference plate and vacuum ports in the platen retain the film section being exposed to the platen. When the platen is in its home or starting position, a reciprocating clamp grasps an edge of the exposed film, the vacuum is released and a predetermined length of film is drawn from the platen to thereby automatically reload the platen with fresh film for exposure. As soon as the exposed film section has been fully withdrawn from the platen, a cutter severs it from the remaining film. Thereafter, transport wheels grasp the film, the clamp releases and the film is transported into a chemical processor for developing so that the exposed film is ready for use substantially immediately after its exposure while a fresh film section is being exposed.

11 Claims, 4 Drawing Figures

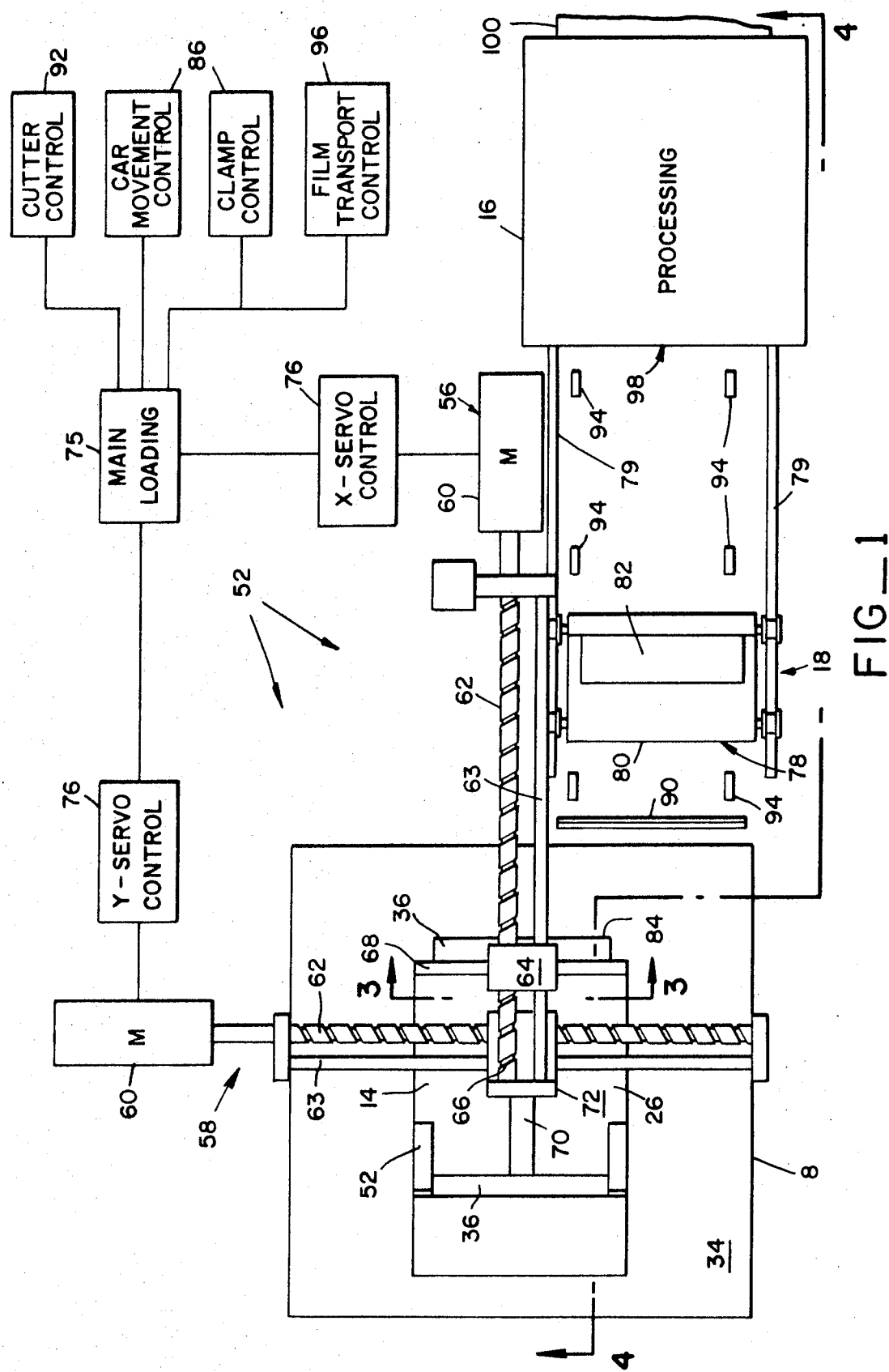
FIG_1

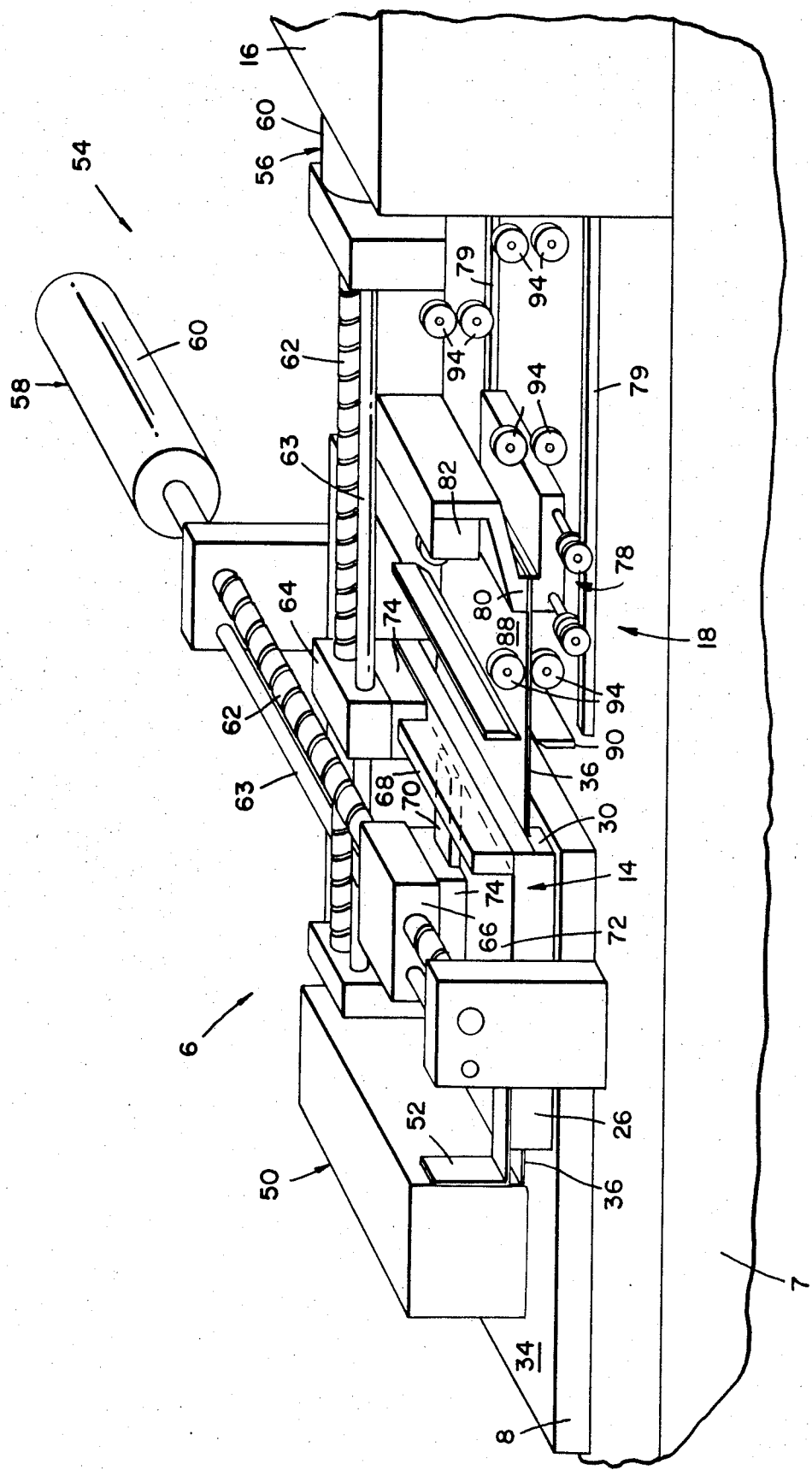
FIG_2

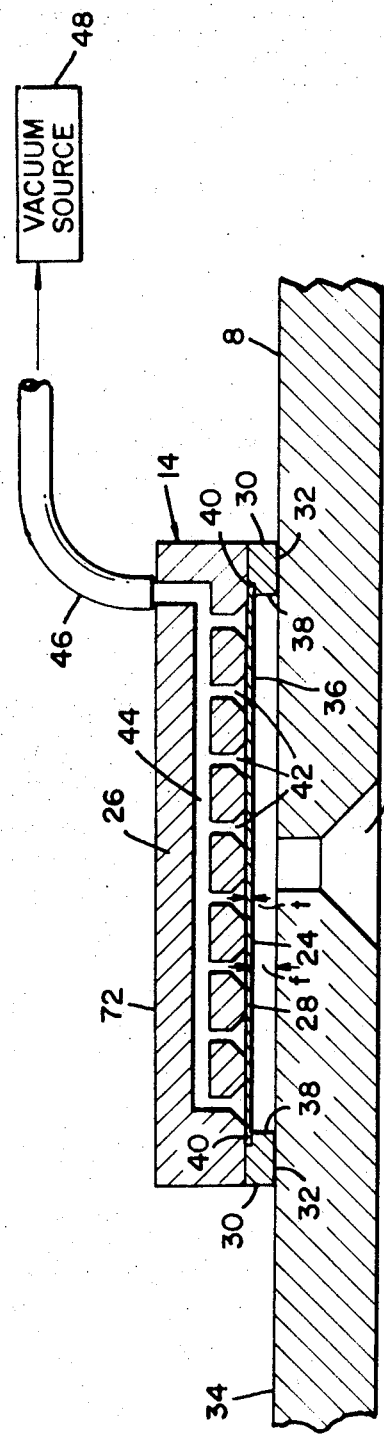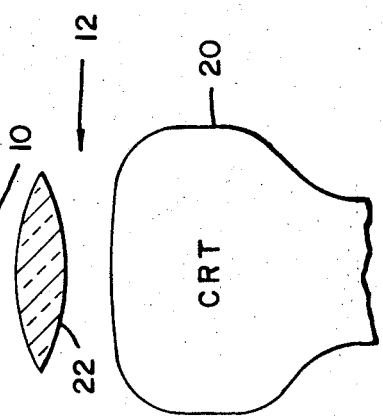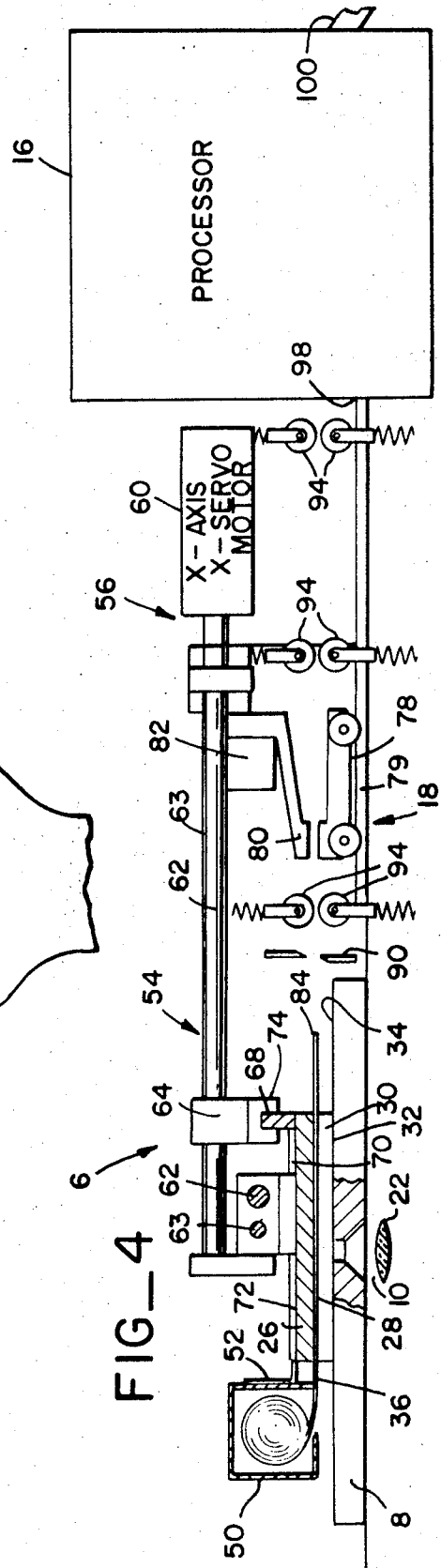

MICROFICHE RECORDER AND PROCESSOR

BACKGROUND OF THE INVENTION

Data storage and retrieval today relies heavily on microfiche recording of the data. Microfiche drastically reduces required storage space for the data, makes the data easily accessible and is relatively inexpensive.

For satisfactory operation, microfilm requires great recording precision. Prior art recorders physically moved the film in the X-direction by moving it relative to the platen using roller drives. The platen paper and the film are removed in the Y-direction. This makes accurate positioning in the X-direction difficult. The film was supplied from a storage reel usually mounted at about the mid-point of one of the "X" or the "Y" direction movements to limit film distortion or twisting during recordation. Frequently, the exposed film is taken up in another cartridge. After a recording session is over, the exposed film is severed for developing. Each time this is done a substantial length of film is wasted.

The recordation takes place on film sections of a predetermined size and is carried out in rectilinear fashion. When a film section is filled with data, the film is advanced for data recordation on the next film section until the full length of film has been exposed. Thereafter, the film is developed and cut to size.

Prior art recorders have several shortcomings. A precise alignment of the tracks and the optics was frequently difficult to achieve and maintain. The required high accuracy in focusing microfiche images could thereby result in a compromised image quality. Film twisting during scanning could move the film section being exposed out of register resulting in inaccuracies in the data recordation and possible problems during data retrieval. Moreover, exposed film was frequently not available for appreciable periods of time until the full length of film stored on the storage reel has been exposed.

SUMMARY OF THE INVENTION

The present invention provides a microfiche recorder-processor which is of high accuracy to assure the recordation of substantially perfect microfiche images. Film being exposed remains in positive registration on the film holder and does not move relative thereto. After full exposure of a film section, it is severed from the film supply. While the next film is being exposed, the first one is transported to a chemical processor for development so that the finished microfiche section of frame is ready for use substantially immediately after completion of the recordation. The microfiche recorder-processor is also well adapted for hook-up with magnetic data readout equipment.

In its broadest aspect, the microfiche recorder-processor of the present invention comprises a flat, horizontal reference plate which has an aperture. Image producing and projecting means are disposed on an underside of the reference plate and project images past the aperture to a focal plane above the plate. A platen or film holder with a flat film support surface above the plate and means evenly biasing a film section against such surface for a flat retention of the film on the surface is mounted to means which positions the surface parallel to the reference plate at a distance from the plate placing a side of the film section in the focal plane. The positioning means permits slidable movements of the platen over the reference plate. Servo drive means engage the holder, position it at a fixed home position, and move the holder and the film section mounted thereto in rectilinear fashion over the aperture. A film supply spool is mounted to the platen for rectilinear movement therewith and is arranged to prevent film twisting and distortion during platen movements. A reciprocable film clamp is disposed opposite the platen, withdraws an exposed film section from the surface and simultaneously advances a fresh film section to the surface while the platen is in its home position. A cutter severs the exposed and withdrawn film section from the remainder of the film. The severed section is then passed into a chemical film processor for film developing so that the developed film is ready for use substantially immediately after its exposure and while a fresh film section is being exposed.

The slidable support of the platen for free movement over the support plate, except as limited by the servo drive mechanism, makes the apparatus of the present invention both relatively inexpensive and of the highest possible accuracy to yield high quality image records. This quality is further enhanced by constructing the means retaining the film section to the holder as a vacuum system which biases the film against the flat supporting surface to prevent the formation of wrinkles, creases or unevenness so that the film is at all times positioned at the precise focal plane of the projecting optics.

By mounting the film supply cartridge or wheel directly to the rectilineraly moving platen, the film supply and the film section being exposed remain fully stationary with respect to each other. Film twisting and distortion and the possible loss of registration of the film in the holder as has happened with prior art systems are thereby prevented.

An exposed film section is removed from the holder by a high speed reciprocating clamp which grasps a protruding free end of the section and pulls it past the platen. As soon as the exposed film section has been withdrawn, it is severed from the remainder of the film. Exposure of the fresh film section of the platen can commence the moment the exposed section has been severed.

The exposed section is then grasped by a suitable transport mechanism and advanced into a chemical film processor for developing and discharge. Once discharged, the microfiche film is ready for use and/or duplication.

Once the recorder of this invention has been loaded with film, recording can take place on a continuing or intermittent basis. The recorder need not be opened for developing the film and there is practically no wasted film.

BRIEF DESCRIPTION OF THE DRAWINGS

FIG. 1 is a schematic plan view of the microfiche recording and processing system of the invention;

FIG. 2 is a perspective side elevational view of the main components of the system of the invention;

FIG. 3 is an enlarged, cross-sectional elevation through a reference plate and the associated platen and is taken on line 3—3 of FIG. 1; and FIG. 4 is a side elevational view through the system and is taken approximately along line 4—4 of FIG. 1.

DESCRIPTION OF THE PREFERRED EMBODIMENTS

Referring to FIGS. 1 through 3, a microfiche recording and processing system 6 constructed in accordance with the invention broadly comprises a support structure 7 on which there is mounted a reference plate 8. The plate has an aperture 10, optics 12 disposed beneath the the horizontal plate, a platen assembly 14 disposed above the reference plate, a chemical film processor 16 for developing exposed film, and transport means 18 for moving exposed film from the platen to the processor. The reference plate forms the main support for the platen assembly.

Mounted beneath the reference plate as part of optics 12 is a cathode-ray tube (CRT) 20 or a like optical device and a suitable lens system 22 that projects an image of the CRT screen through aperture 10 in a focal plain 24 spaced above plate 8 a distance "$f$."

Referring now to FIGS. 1 through 3, platen assembly 14 comprises a flat platen 26 which has a film retaining underside 28 and which is carried by a pair of "L" shaped legs 30. The "L" shaped legs terminate in flat ends 32 that rest directly on top surface 34 of reference plate 8. The legs have a height so that the spacing between the top surface of the plate and underside 28 of platen 26 equals focal plane distance "$f$" plus the thickness "$t$" of film 36 retained to the underside of the platen.

The "L" shaped legs have inwardly protruding ends 38 and they are spaced apart so that the legs in conjunction with underside 28 of platen 26 define film guides 40. The film guides permit film 36 to move longitudinally from one end of platen 26 to the other.

Platen 26 further includes a plurality of port holes 42 suitably interconnected by conduits 44 and equally distributed throughout the platen underside. A flexible hose 46 is connected to a vacuum source 48. Suitable valving (not separately shown in the drawings) is provided for selectively subjecting port holes 42 to a vacuum and releasing the vacuum. When film 36 is held in guides 40 and vacuum is supplied to the port holes, the film is firmly biased against the flat underside of platen 26 and the emulsion side of the film is positioned in focal plane 24. Consequently, images of the CRT projected through optical aperture 10 are accurately focused on the film to assure high quality recordation of the images.

A supply of film is stored on a film storage reel in a film cartridge 50 carried by support brackets 52 mounted to platen 26 so that the film on the reel is aligned with film guides 40. Any movements of platen assembly 14 on plate 8 are duplicated by the film storage reel. Film retained to platen underside 28, therefore, remains stationary with respect to film on the storage reel. Twisting or distortion of film due to relative movements between the film supply and the platen assembly are thereby prevented.

Referring to FIGS. 1 and 2, a servo drive mechanism 54 is provided to move platen assembly 14 in a rectilinear fashion. The servo drive comprises an X-axis servo unit 56 and a Y-axis servo unit 58. Each servo unit has a motor 60, a lead screw 62 engaged by respective first and second nuts 64 and 66 and a guide bar 63 slidably engaged by the nut. Perpendicular X and Y-axis tracks 68 and 70 are mounted to an upperside 72 of platen 26. Nuts 64 and 66 have track engaging lower sections 74 which render the nuts slidable along their respective tracks and rigid in directions perpendicular to the tracks.

A servo control 76 is suitably programmed or actuated by a main, computer operated control unit 75 to always position platen assembly 14 at its home position (shown in FIG. 1 in phantom lines). The home position is so selected that optical aperture 10 overlies the upper left-hand extremity, as viewed in FIG. 1, of the film section on platen underside 28. Thereafter, and in coordination with the formation of images on the CRT, the X and Y-axis servos 56 and 58 are intermittently energized to advance the holder for linear recordation of images in lines which are parallel to the X-axis and spaced in the Y-axis. After the last line has been exposed, the servo control returns the platen assembly to its home position.

During all movements of the platen assembly, platen 26 slidably moves on legs 30 over upperside 34 of reference plate 8. The precision ground, flat top surface of the plate thereby assures that the film section being exposed remains always in the focal plane 24. To prevent wear on the reference plate or on legs 30, the flat ends 32 of legs 30 and/or top surface 34 of reference plate 8 can be coated with low friction materials such as Teflon.

Referring to FIGS. 2 and 4, a reciprocating carriage 78 is movable along a guide bar or track 79 aligned with, that is parallel with respect to film guides 40 of platen assembly 14. The carriage includes a film clamp 80 actuated by an electro magnet 82. Suitable drive means (not separately shown) reciprocate the carriage towards and away from a free film end 84.

A carriage and clamp control 86 is operated by main control 75 and operates the carriage and clamp. When servo drive mechanism 54 returns platen assembly 14 to its home position, the clamp is opened and the carriage is positioned adjacent free film end 84. The clamp is then closed to grasp the free film end and the vacuum in port holes 42 of platen 26 (shown in FIG. 3) is released. Thereupon, the carriage is drawn to the right, as viewed in FIGS. 1 and 4 away from platen assembly 14. An exposed film section 88 is thereby withdrawn from beneath plate underside 28. The carriage travel is adjusted so that it ceases when the full length of the exposed film section has been withdrawn. Thereupon, the vacuum in port holes 42 (FIG. 3) is re-applied to firmly bias a fresh film section against platen underside 28.

Positioned adjacent, but spaced from platen 26 is a cutter 90. When the exposed film section 88 has been fully withdrawn from the platen assembly 14 and past a cutting plane of cutter 90, cutter controls 92, also operated by main control 75, energizes the cutter to sever the exposed film section from a remainder of the film. The cutter blades are immediately withdrawn and a free film end 84 that is spaced from the adjacent end of platen 26 remains.

Thereafter, servo control 76 energizes the servo drive mechanism and images to be recorded on the fresh film section are generated by CRT 20.

Simultaneously with the cut-off of the exposed film section 88, multiple sets of recilient transport wheels 94 disposed on both sides of the exposed, severed film section are biased against the film and each other to firmly hold the film section. Once held by the transport wheels 94, carriage and clamp control 86 opens the clamp and releases the film section. Thereupon, a film transport controls 96, also operated by main control 75, energizes transport wheels 94 to transport the exposed film section away from platen assembly 14 and into a schematically illustrated receiving slot 98 of film processor 16. Simultaneously with the actuation of the transport wheels carriage and clamp 78, 80 are moved out of the path of the film section. This movement can be accomplished in a variety of ways as by raising or lowering the carriage with suitably constructed mechanisms, swinging the carriage out of the path or guiding the film section with sets of guide rolls over or under the carriage and the clamp. Such constructions are readily within the purview of those skilled in the art and, therefore, not further described herein. After the film section has passed the carriage is returned to adjacent platen 8 for grasping the next exposed film section.

Once the exposed film section is received in the processor, it conventionally passes through baths and treatment stations, is dried and then discharged into a chute 100. The film is now ready for use and/or duplication.

The instant cutter 90 severs the exposed film section 88, and while the exposed section travels towards and through the film processor, the recordation of CRT images on the fresh film section retained to plate underside 28 commences and continues. There is, therefore, no need for waiting until all available film sections have been exposed before all of them are simultaneously developed. Rather, film exposing and developing are independent of each other to assure a high through-put rate and render each independent film section available for use in the shortest possible time.

Although the recorder of this invention has been shown and described as having a horizontally oriented reference plate on which the platen assembly slides, the reference plate can also be vertical. In such a construction, biasing means, such as springs disposed between the platen and the lead screw, or at a similarly appropriate place, would be provided to press the platen assembly against the vertical reference plate.

I claim:

1. A microfiche recorder comprising a flat plate having an aperture, a platen including a flat film mounting surface parallel to the plate, the platen being slidably movable over a sufficient portion of the plate to position substantially any area of the surface over the aperture, a film supply reel mounted to the platen for feeding film onto the surface and moving the film supply with the platen, means for moving the platen in X and in Y directions over the plate, optical means disposed on a side of the plate opposite the platen for forming an image adjacent the surface and focused in a plane of the film when film is placed against the surface, vacuum forming means for firmly biasing film against the platen surface to maintain the film flat in the focal plane, whereby images can be sequentially recorded on the film after intermittent X-Y movements of the platen, and means for removing exposed film from the surface.

2. A recorder according to claim 1 wherein the plate is substantially horizontal and the platen overlies the plate, wherein the film support surface faces downwardly towards the plate, and wherein the vacuum forming means includes a plurality of port holes distributed over the surface and means for connecting the port holes to a vacuum and assuring a firm contact between the film and the surface.

3. A recorder according to claim 1 including cutting means for severing exposed film from a remainder of the film after the exposed film has been removed from the surface.

4. A recorder according to claim 1 wherein the film removing means comprises clamp means for grasping a free end of the film supply, and means for moving the grasping means in one of the X or the Y directions a predetermined distance to thereby pull a fixed length of film including the exposed film past the surface for subsequent processing of the exposed film and for exposure of a fresh film length with the optical means.

5. A microfilm recording system comprising a horizontally disposed flat reference plate including an optical aperture, a film holding platen including means slidably engaging the plate and spacing a flat film mounting surface of the platen from and parallel to the plate, means for securely biasing a length of film flat against mounting surface of the platen, a film supply storage reel mounted to the platen for feeding film to the film retaining side of the platen, means for moving the platen in perpendicular X and Y directions, means for projecting an image through the aperture onto the film and for focussing the image in a focal plane of the film retained to the surface, means for intermittently advancing exposed film sections away from the platen to thereby simultaneously advance a fresh, unexposed film section to the side, and means for thereafter severing the exposed section.

6. An optical recording system for recording projected images on a film comprising: a platen assembly having a flat underside and a plurality of vacuum port holes on the underside for biasing film thereagainst and maintaining it flat to assure high resolution recording, at least one support member projecting from the side of the assembly and terminating in a flat support surface that is parallel to the underside, a flat reference plate permitting uninhibited slidable motions of the member so that substantially every portion of the film retained to the surface can be exposed to an image focused above the plate, means for moving the assembly in X and Y directions over the plate, stationary means projecting the images from a side of the plate opposite the assembly, means for intermittently withdrawing exposed film sections from the underside, and means for automatically passing exposed sections through a film processor for developing the film section for substantially immediate use after recordation on the section while a fresh section on the underside is being exposed to the images.

7. A system for the recordation of microfiche images on film sections of a predetermined size comprising a relatively large, flat reference plate including at least one optical aperture, light display means beneath the plate and lens means for forming an image of the display means above the plate, a relatively small platen disposed above the plate and having a flat underside parallel to the plate for positioning a film section in the focal plane of the lens means, the platen having downwardly extending members freely slidable over the plate, means coupled to the platen for moving it in perpendicular X-Y directions, the moving means including means limiting the slidable movement of the platen on the plate so that the image projected by the lens means always falls on a portion of the film section, a continuous length film mounted to the platen for feeding film to beneath the platen, means for retaining a film section advanced from the film supply immovably and flat to the underside of the platen, the moving means further including means for positioning the platen in a home or starting position, a linearly movable carriage adjacent the platen having clamp means for grasping a free end of the film section, means for moving the carriage and the grasped section away from the platen to thereby automatically advance a fresh film section to beneath the platen, means to thereafter sever the exposed film section from the fresh section, a film processor for developing the section, and means for transporting the severed exposed section to the processor.

8. A system according to claim 7 wherein the severing means sever the exposed section at a point spaced from the platen to provide a free film end which protrudes from the platen.

9. A system according to claim 7 including means for substantially evenly biasing all parts of the section against the underside of the platen.

10. A system according to claim 9 wherein the biasing means comprises a plurality of vacuum ports distributed over and terminating at the underside of the platen, and a vacuum source connected with the ports.

11. A microfiche recording and processing unit comprising a flat, horizontal reference plate including aperture means, image producing and projecting means on an underside of the plate projecting an image past the aperture means to a focal plane above the plate, film holding means defining a flat film support surface above the plate, means for evenly biasing a film section against such surface for a flat retention of the film on the surface, means positioning the surface parallel to the plate at a distance from the plate placing a side of the section in the focal plane, the positioning means permitting slidable movements of the surface defining means over the plate, servo drive means engaging the surface defining means and positioning the surface defining means at a fixed home position, the servo drive means being operable for moving the surface defining means and the film section mounted thereto in rectilinear fashion over the aperture means, a film supply spool mounted to the surface defining means for rectilinear movement therewith and arranged to prevent film twisting and distortion during such movement, means disposed opposite the film holding means for clamping a film end, means for reciprocating the clamping means a predetermined distance to withdraw an exposed film section from the surface and simultaneously advance a fresh film section to the surface when the surface defining means is in its home position, means for severing the exposed and withdrawn film section from the remainder of the film, a chemical film processor, and means for passing the exposed film section into the chemical processor for film developing and use of the developed film substantially immediately after its exposure and while a fresh film section is being exposed.

* * * * *